United States Patent
Ota et al.

(10) Patent No.: US 6,379,777 B1
(45) Date of Patent: Apr. 30, 2002

(54) DIE AND PRODUCTION METHOD THEREOF, GLASS SUBSTRATE AND PRODUCTION METHOD THEREOF AND METHOD OF FORMING PATTERN ON THE GLASS SUBSTRATE

(75) Inventors: Takashi Ota, Kasugai; Masashi Fukuyama, Komaki; Kazutoshi Tohyama, Nakatsugawa, all of (JP)

(73) Assignees: NGK Insulators, Ltd.; NGK Optoceramics Co., Ltd., both of Nagoya (JP)

( * ) Notice: Subject to any disclaimer, the term of this patent is extended or adjusted under 35 U.S.C. 154(b) by 0 days.

(21) Appl. No.: 09/367,729
(22) PCT Filed: Dec. 24, 1998
(86) PCT No.: PCT/JP98/05882
 § 371 Date: Nov. 2, 1999
 § 102(e) Date: Nov. 2, 1999
(87) PCT Pub. No.: WO99/33753
 PCT Pub. Date: Jul. 8, 1999

(30) Foreign Application Priority Data

Dec. 24, 1997 (JP) ............................................. 9-355634

(51) Int. Cl.⁷ .............................. B32B 3/00; B24B 1/00; B29D 11/00; C03B 13/00
(52) U.S. Cl. ......................... 428/156; 428/167; 451/28; 65/93; 65/102; 65/61; 264/1.1; 264/2.7
(58) Field of Search .............................. 65/44, 93, 102, 65/104, 106, 225, 61; 428/167, 156; 264/1.1, 2.5, 2.7; 451/28; 425/376.1, 461; 156/153, 209; 249/187.1, 205

(56) References Cited

U.S. PATENT DOCUMENTS

| 666,717 | A | * | 1/1901 | Van Dyck | 428/167 |
| 3,883,335 | A | * | 5/1975 | Polaert | 65/4 |
| 4,813,990 | A | * | 3/1989 | Thorn | 65/105 |
| 5,224,978 | A | * | 7/1993 | Hermant et al. | 65/94 |

FOREIGN PATENT DOCUMENTS

JP 4-119673 4/1992

* cited by examiner

*Primary Examiner*—Donald J. Loney
(74) *Attorney, Agent, or Firm*—Burr & Brown

(57) ABSTRACT

On the pressing surface of a die, a first protrusion having a substantially triangular cross section and a second protrusion having a length which is greater than a width thereof and a substantially trapezoidal cross section in planes extending through both length and width dimensions thereof are provided. By press forming, a groove with a substantially V-shaped cross section to mount an optical part, and a groove with a substantially inverse-trapezoidal cross section providing an alignment marking are formed, being inverse-transferred in correspondence with the respective protrusions on one principal surface of a glass substrate. Forming such a pattern on a glass substrate produced with a die enables alignment of the glass substrate with a mask for photolithography with high accuracy.

12 Claims, 3 Drawing Sheets

DIE AND PRODUCTION METHOD THEREOF, GLASS SUBSTRATE AND PRODUCTION METHOD THEREOF AND METHOD OF FORMING PATTERN ON THE GLASS SUBSTRATE

TECHNICAL FIELD

The present invention relates to a die and a method of manufacture of the same to form a groove for mounting an optical part on a workpiece, a glass substrate which is produced with the said die and a method of manufacture of the same, and a method of pattern formation on glass substrate.

BACKGROUND ART

Up to now, methods of manufacture of glass elements by forming glass substrates by the press forming method have been used.

For example, to manufacture a substrate to mount an optical element (such as an optical fiber and a polarizer), a V-shaped groove (hereafter simply expressed as a V-groove) to position and dispose an optical fiber must be formed on a glass substrate, and in addition, the elements, such as a polarizer, must be disposed in the locations separated from the groove exactly by set distances.

To achieve this, a mask for photolithography is aligned with a glass substrate and, for example, tightly contacted with it. Then, by exposing them to ultraviolet light, a pattern in accordance with the mask pattern on the mask is formed. Thereafter, a Ti material or the like for forming devices is coated on the glass substrate, followed by etching treatment.

In this case, to accurately dispose the devices in the set locations, it is essential to align the glass substrate with the mask for photolithography with high accuracy. Therefore, it is necessary to provide an alignment marking on the glass substrate, such as a line, point, or other marking, to use as a reference for alignment with the mask for photolithography.

Conventionally, the V-groove itself formed on the glass substrate, i.e., the straight lines for the four sides forming the opening of the V-groove or the straight line in the deepest portion is used as the alignment marking, and by employing an aligner, the alignment marking on the glass substrate is aligned with the mask for photolithography. However, the edge portions of the opening of the V-groove are formed in a shape with a radial, rather than a sharp, cross section, and thus, they cannot be visually identified as straight lines for the four sides. In other words, the straight lines for the four sides in the opening portion of the V-groove offer poor visibility, and thus, it is difficult to align them with the mask for photolithography with high accuracy.

On the contrary, the straight line formed in the deepest portion of the V-groove offers satisfactory visibility since deepest portion has a sharp cross section. However, because the distance to the deepest portion of the V-groove is usually longer than the focal depth for the microscope in the aligner, it is difficult to align with high accuracy even if the straight line formed in the deepest portion of the V-groove would be used as an alignment marking.

Further, another difficulty is that the straight line (alignment marking) formed by the deepest portion of the V-groove and the marking provided on the mask for photolithography cannot be identified simultaneously, since the distance to the deepest portion of the V-groove is longer than the focal depth for the microscope in the aligner.

The present invention has been provided in consideration of these problems, and offers a die and a method of manufacture of the same, wherein a patterned die for forming grooves to mount optical parts on a workpiece is provided such that a pattern formed on the workpiece can be aligned with a mask for photolithography with high accuracy. Another purpose of the present invention is to offer a glass substrate and a method of manufacture of the same in which grooves having a substantially V-shaped cross section to mount optical parts are formed on the glass substrate, and the mask for photolithography can be aligned with high accuracy. Further, another purpose of the present invention is to offer a method of pattern formation on one principal surface of a glass substrate with which the mask for photolithography can be aligned with high accuracy.

DISCLOSURE OF THE PRESENT INVENTION

The die according to the present invention is configured, comprising a first protrusion having a substantially triangular cross section on a pressing surface and a second protrusion having a length which is greater than a width thereof and a substantially trapezoidal cross section in planes extending through both length and width dimensions thereof. The first protrusion forms a groove having a substantially V-shaped cross section to mount an optical part on a workpiece, and the second protrusion forms a groove having a substantially inverse-trapezoidal cross section to provide an alignment marking on the workpiece.

By this, on a workpiece formed with the die, a groove having a substantially V-shaped cross section to mount (position and dispose) an optical part is formed, and at least one, more preferably two or more, grooves having a substantially inverse-trapezoidal cross section providing an alignment marking are formed. In other words, the second protrusion provided on the pressing surface of the die is formed in a substantially trapezoidal cross sectional shape, thus, when the shape is transferred to a workpiece, being inverted, a groove having a substantially inverse-trapezoidal cross section is formed in the workpiece. It is preferable that the inverse-trapezoidal groove has a depth within the focal depth for the optical inspection machine, for example, a depth of 1 to 20 $\mu$m.

The edge portion of the bottom of this groove having a substantially inverse-trapezoidal cross section is sharp in cross section, and can be visually identified as straight lines for the four sides with clearness. Yet, the edge portion of the bottom of the groove is shallower than the bottom of the V-shaped groove, and thus within the focal depth for the microscope in the aligner.

Therefore, in an application where the workpiece is a glass substrate, in aligning the glass substrate with a mask for photolithography and forming a pattern on one principal surface of the glass substrate, if the inverse-trapezoidal groove is used as an alignment marking for aligning, the straight lines for the four sides constituting the bottom of the groove can be visually identified with clearness. The alignment marking and the marking on the mask can be visually identified simultaneously, thus, the glass substrate can be aligned with the mask with high accuracy. In this case, it is necessary to provide at least one groove having a substantially inverse-trapezoidal cross section as the alignment marking.

The groove having a substantially inverse-trapezoidal cross section providing the alignment marking can also be used as a marking to identify the orientation of the glass substrate. In this case, the direction of conveying and the state of disposition of the glass substrate can be electrically identified, and thus it is effective for full automation of the volume production system using the glass substrate.

Further, if any two of the straight lines for the four sides forming the bottom of the groove having an inverse-trapezoidal cross section are used as reference lines for positioning, alignment of the glass substrate with the mask for photolithography can be favorably performed. In addition, it is more preferable to provide a plurality of the grooves having an inverse-trapezoidal cross section as needed, and in correspondence with this, to provide a plurality of markings on the mask for photolithography. The groove having a substantially V-shaped cross section to mount an optical part on the glass substrate may be provided for the number corresponding to the required number of optical parts to be mounted.

Next, with the method of manufacture of a die according to the present invention, in manufacturing the die from the base material by grinding, the first protrusion to form a groove having a substantially V-shaped cross section and the second protrusion to form a groove having a substantially inverse-trapezoidal cross section are simultaneously provided in die manufacturing. By this, compared to a case where the alignment marking is provided on the glass substrate separately from the groove having a substantially V-shaped groove, the distance between the groove having a substantially V-shaped groove and the alignment marking can be set with high accuracy, and the number of production steps is reduced. Further, when a photodiode or a laser diode is fixed on a glass substrate as a device to mount an optical element (hereafter expressed as a substrate for mounting) separately from the pattern formation, by using a die according to the present invention, the distance between the fixing location of the photodiode or the laser diode and the location of a groove having a substantially V-shaped cross section where an optical fiber is mounted can be determined with high accuracy.

With the method of fixing the above stated photodiode or laser diode on a glass substrate, a plurality of substrates for mounting are formed simultaneously on a glass substrate having fixed dimensions, and then the glass substrate is divided to obtain individual substrates for mounting. If, however, a photodiode or a laser diode was not previously fixed on the glass substrate before division, a photodiode or a laser diode can be fixed on the individual substrates after dividing the glass substrate. In this case, electrode patterns for fixing the photodiode or the laser diode thereon and marks corresponding to the electrode patterns are drawn on a mask for photolithography, and thus, positioning the photodiode or the laser diode can be performed favorably.

BEST MODE FOR CARRYING OUT THE INVENTION

Hereinbelow, a preferred embodiment of the present invention (hereafter the present embodiment) is explained with reference to the accompanying drawings.

First, a die for forming a glass substrate according to the present embodiment, and a glass substrate which is formed by use of the die are described with reference to FIG. 1 and FIG. 2.

Figure 1:
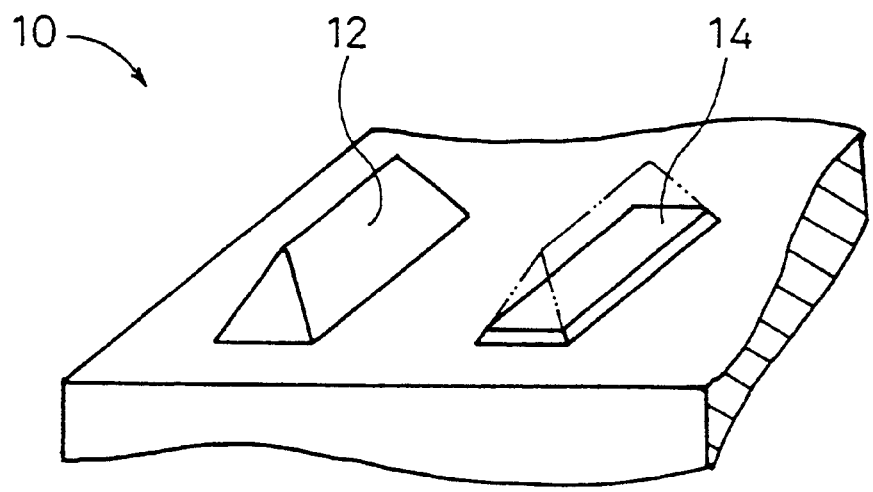
FIG. 1 shows a partial cutaway perspective view of a die for press forming a glass substrate provided with a protrusion having a substantially triangular cross section and a protrusion having a substantially trapezoidal cross section.
Figure 2:
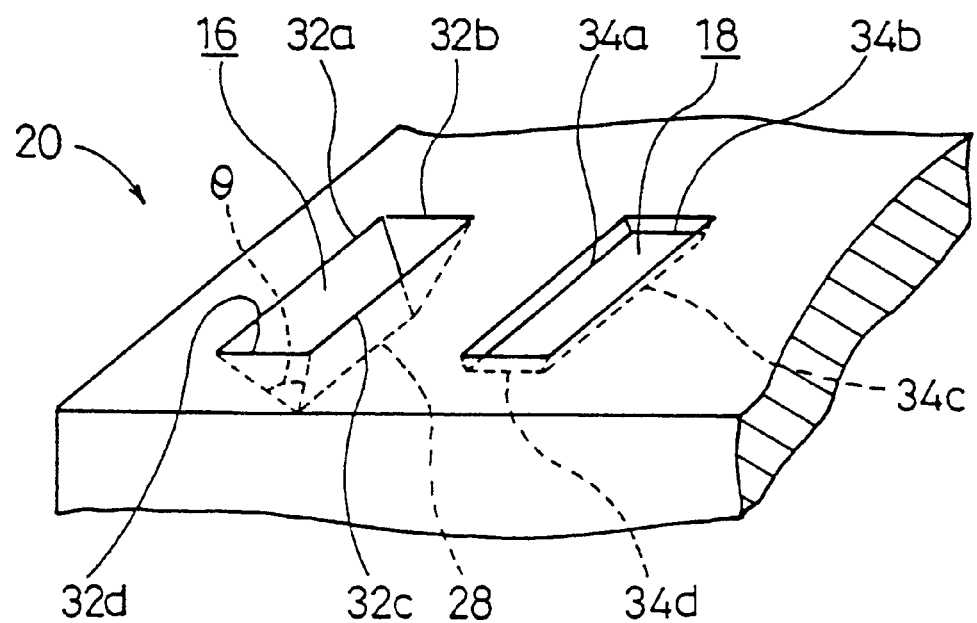
FIG. 2 shows a partial cutaway perspective view of a glass substrate which is press-formed using of the die in FIG. 1.

As shown in FIG. 1, on the pressing surface of a die 10 for forming a glass substrate according to the present embodiment, a protrusion 12 having a substantially triangular cross section, and a protrusion 14 having a substantially trapezoidal cross section are provided, being separated from each other exactly by a set distance. The protrusion 12 and the protrusion 14 of the die 10 are transferred to a glass substrate 20 which is pressed using the die 10 in the inverted shape, and as shown in FIG. 2. In that manner, a groove 16 having a substantially V-shaped cross section and a groove 18 having a substantially inverse-trapezoidal cross section are formed at locations being separated from each other exactly by a set distance. The term "trapezoidal" refers to the shape of trapezoid whose upper side (upper base) is shorter than the lower side (lower base), while the term "inverse-trapezoidal" refers to the shape of trapezoid whose upper side (upper base) is longer than the lower side (lower base).

Here, the groove 16 having a substantially V-shaped cross section on the glass substrate 20 is provided to mount an optical fiber (not shown). When a standard optical fiber having a diameter of 125 $\mu$m and an opening angle θ of approximately 70° is used, the groove 16 preferably has a maximum depth of 150 $\mu$m. When a photodiode or laser diode is fixed on the glass substrate 20, the groove 16 is dimensioned so that the level of the photodiode or laser diode (the position of the active layer) is the same as that of the center of the cross section of the optical fiber. For example, with the present embodiment, the center of the cross section of the optical fiber is positioned approximately 20 $\mu$m above the groove 16.

Figure 3:
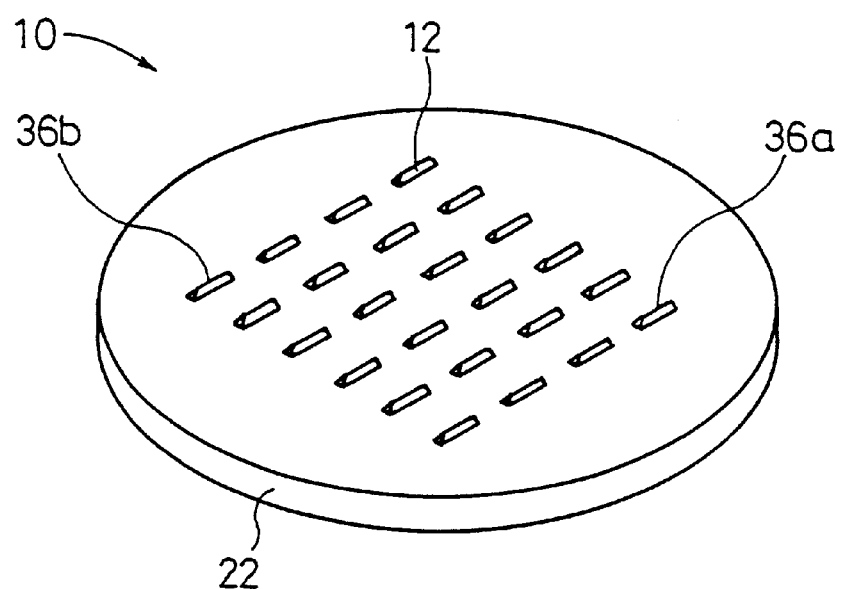
FIG. 3 shows a perspective view illustrating a number of protrusions is provided on the die.

Next, the method of manufacture of the die 10 and the glass substrate 20 using the die 10 is explained with reference to FIG. 3 and FIG. 4. First, as shown in FIG. 3, a wafer 22 made of a cemented carbide material, the principal component which is tungsten carbide, and which has a diameter of 2 in. and a height of 10 mm, is prepared as a die base material. By grinding this wafer 22, 4×6 rows of protrusions 12 having a substantially triangular cross section to form grooves 16 having a substantially V-shaped cross section on the glass substrate 20 are provided as shown in FIG. 3.

Figure 4:
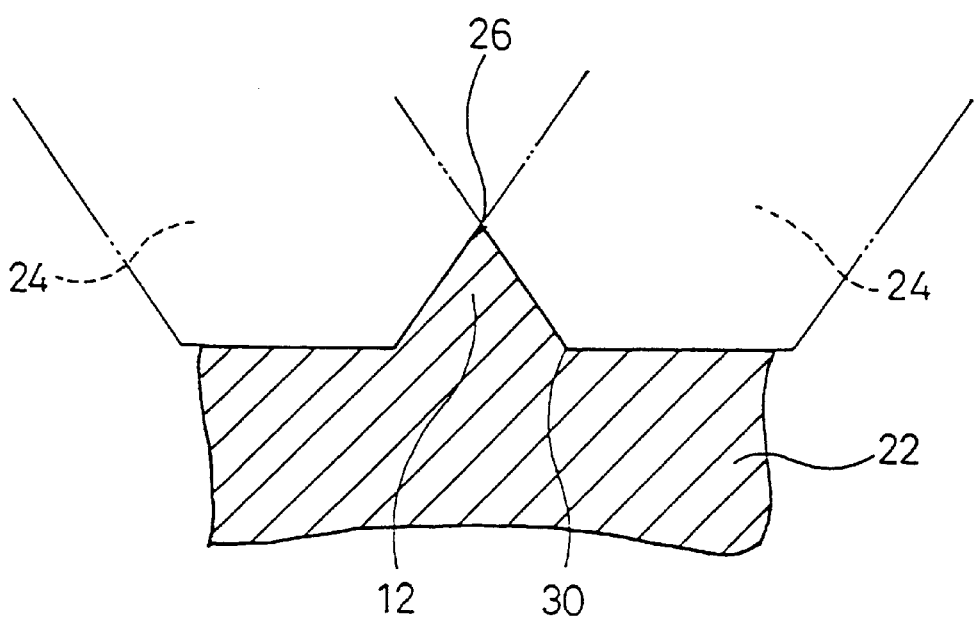
FIG. 4 illustrates one of the protrusions of the die having a substantially trapezoidal cross section formed by grinding.

As shown in FIG. 4, the protrusion 12 is produced by grinding the surface of a cemented carbide material 22 having a height of 10 mm with a trapezoidal grinding stone 24 (abrasive grain: diamond; bond: metal bond; grain size: #1500). In this case, the crest 26 of the protrusion 12 is formed in a sharp edge corresponding to the straight line 28 for the deepest portion of the groove 16, having a substantially V-shaped cross section which is transferred being inverted as shown in FIG. 2. However, the root 30 of the protrusion 12, corresponding to the four sides 32a to 32d of the opening of the groove 16 in FIG. 2 which is inversely transferred, is formed in a shape having a radius resulting from the geometry of the trapezoidal grinding stone 24, the progress of wear on it, etc.

Therefore, as stated above, if the four sides 32a to 32d of the opening of the groove 16 formed in the glass substrate 20 are used as an alignment marking, the straight line cannot be visually identified with clearness with the aligner, and thus it is difficult to make alignment of the glass substrate 20 with the photolithography mask with high accuracy. Further, using the straight line 28 of the deepest portion of the groove 16 as an alignment marking is not favorable either, because the straight line 28 for the deepest portion provides a maximum depth of 150 $\mu$m, which is out of the focal depth (for example, 20 $\mu$m) for the microscope in the aligner.

Therefore, with the present embodiment, the number of the protrusions 12 corresponding to the number of optics to be provided is formed by grinding. Then, the crest of at least one of the protrusions 12 is ground using a microgrinder to form a protrusion 14 having a substantially trapezoidal cross section for forming a groove 18 having a substantially inverse-trapezoidal cross section, which provides an alignment marking (see FIG. 1). By using the die 10 for pressing, a groove 18 having a substantially inverse-trapezoidal cross section is formed on the glass substrate 20, and this can be used as an alignment marking. Thus, in the following explanation, this groove 18 will also be expressed as the alignment marking 18.

In other words, the straight lines 34a to 34d for the four sides comprising the bottom portion of the groove 18 offer a good visibility because the four sides are formed in an edge shape. Further, by setting the depth of the bottom portion (corresponding to the height of the protrusion 14 having a substantially trapezoidal cross section of the die 10) in the range of 1 to 20 $\mu$m, preferably at about 3 $\mu$m, the four sides are brought within the focal depth for the microscope in the aligner, which also contributes to good visibility.

Here, it is not favorable for the depth of the bottom portion of the glass substrate 20 (i.e., the height of the protrusion 14) to be less than 1 $\mu$m, since the die 10 has a surface roughness of 0.5 $\mu$m when ground, and considering the grinding accuracy required. Further, a depth over 20 $\mu$m is not favorable because the depth is out of the range of the focal depth for the microscope in the aligner.

With the present invention, two of the 4×6 rows of protrusions 12 having a substantially triangular cross section shown in FIG. 3 (which are indicated with reference numerals 36a and 36b) are further ground to a substantially trapezoidal shape in cross section to produce protrusions 14 for forming alignment markings. This is because the aligner has generally two fields of view, allowing more accurate positioning using the two fields of view for position/turning angle adjustment. Thus, it is more preferable that the protrusions 36a and 36b, which are in the positions approximately point-symmetrical about the center of the wafer 22, be used as protrusions 14 for forming two alignment markings.

One protrusion 14 for forming an alignment marking, may be provided, or all of one row of protrusions may be made into protrusions 14 for forming of alignment markings. Or, instead of the above ways, a protrusion 14 for forming an alignment marking which has arbitrary dimensions may be provided in any location on the pressing surface of the die 10.

Further, the protrusion 14 for forming an alignment marking may be used as an alternative to an orientation flat for the wafer 22. In this case, it allows the direction of conveying and the state of disposition of the wafer 22 to be electrically identified, and thus it is effective for full automation of the volume production system using the wafer 22.

Then, a Ni layer of 0.1 $\mu$m in thickness, a Pt-Ir layer of 0.4 $\mu$m in thickness, and a Pt layer of 0.4 $\mu$m in thickness are sputtering-coated in this order onto the pressing surface of the die 10 formed as stated above. This improves the releasability of the glass substrate 20 from the die 10, allowing the effects of the present invention to be enhanced without the edge shape of the alignment marking 18 being impaired.

A chemically strengthened glass material which is not subjected to ion-exchange treatment (manufactured by NGK INSULATORS, LTD., having a trade name of PC-4) is preferably used in the method of press forming the glass substrate 20 with the die 10. This allows press forming under a forming temperature of 620°, a forming pressure of 3000 kgf, and a forming time of 90 s. In addition, a Ti layer of 0.1 $\mu$m in thickness, a Pt layer of 0.1$\mu$m in thickness, and an Au layer of 1.0 $\mu$m in thickness are formed on the surface of the glass substrate 20 as a material for forming optical parts.

Next, the method of forming a pattern on the glass substrate 20 is explained. First, after forming a photoresist film on the glass substrate 20, the photoresist film is patterned by the known photolithography technique. In this patterning, a mask on which the required patterns, such as an electrode pattern, are drawn is used to form openings on the photoresist film. Here, on the mask, markings 40a, 40b used as a positioning reference (marks for positioning) are formed (see FIG. 5), and the required patterns, such as an electrode pattern, are formed in the locations at set distances from the reference marks for positioning 40a, 40b with high accuracy.

On the other hand, the geometry of the pressing surface of the die 10 as shown in FIG. 3 is transferred on the glass substrate 20, being inverted, and the grooves 18 having a substantially inverse-trapezoidal cross section corresponding to the two protrusions for forming alignment markings (indicated by reference numerals 36a, 36b) are formed. The photolithography patterning on the photoresist film is made by aligning the marks for positioning 40a, 40b onto the mask with the alignment marking 18 on the glass substrate 20. By this, the required patterns onto the mask are transferred on the photoresist film with high accuracy.

Figure 5:
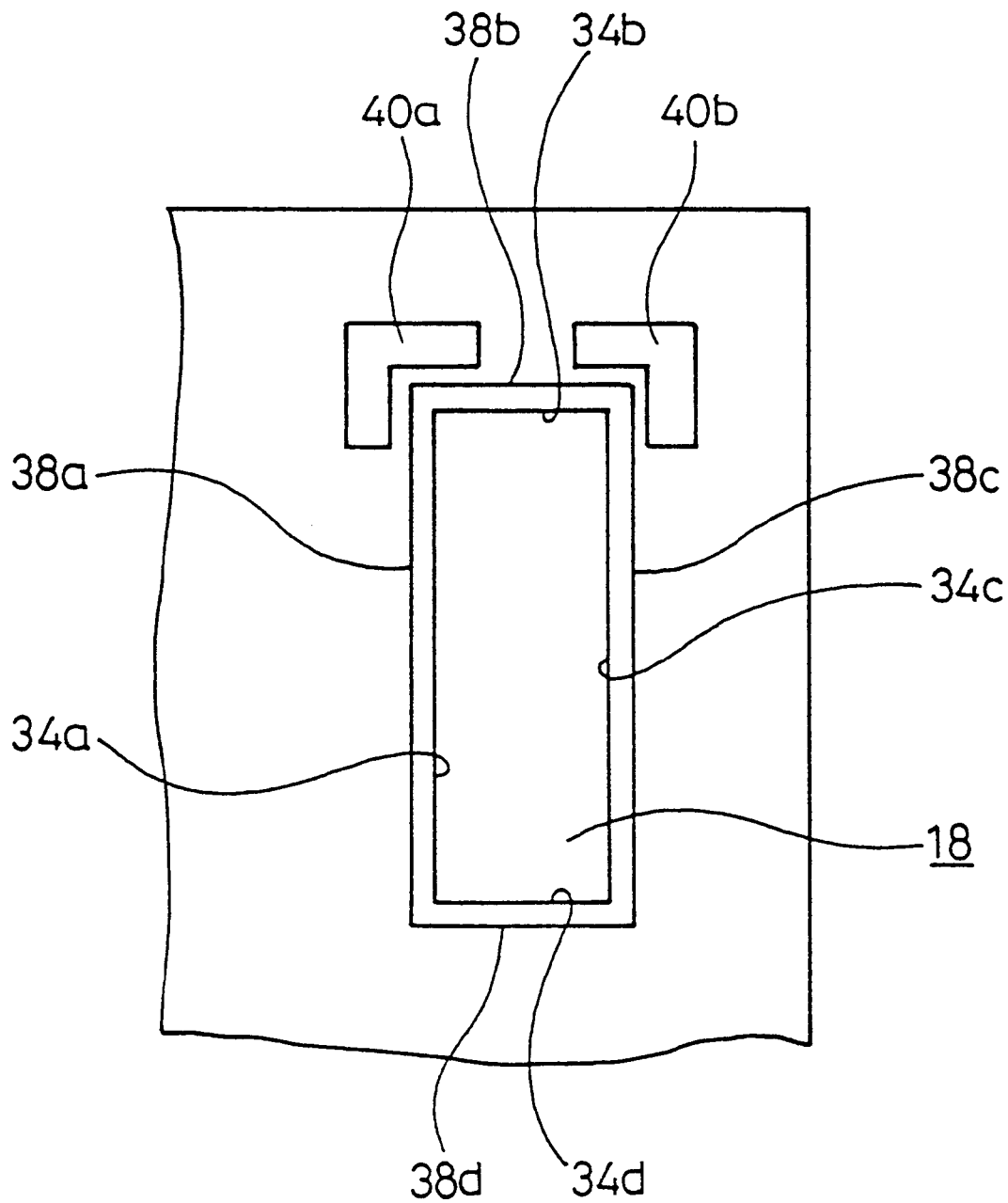
FIG. 5 is a conceptual drawing to explain the alignment marking on the glass substrate being aligned with the mask markings by use of an aligner.

FIG. 5 shows an observation image by the aligner to align one alignment marking 18 on the glass substrate 20 with the markings for positioning 40a, 40b. The four sides 38a to 38d in the apex portion of the groove having a substantially inverse-trapezoidal cross section constituting the alignment marking 18 are formed in a shape with a radius, and thus cannot be visually identified as straight lines with clearness.

Contrarily, the four sides 34a to 34d in the bottom portion of the groove having a substantially inverse-trapezoidal cross section constituting the alignment marking 18 are formed in an edge shape, and thus can be visually identified as straight lines with clearness. By using three of the four sides 34a to 34d as the reference lines, the alignment marking 18 can be easily aligned with the two markings 40a, 40b. In doing this, the other alignment marking 18 on the glass substrate 20 is simultaneously aligned with other markings for positioning 40a, 40b on the mask.

Then, after patterning the photoresist film, a metallic thin film for optical parts (a Ti layer of 0.1 $\mu$m in thickness, a Pt layer of 0.1 $\mu$m in thickness, and an Au layer of 0.5 $\mu$m in thickness) is formed by vacuum deposition on the entire surface including the remaining photoresist film. Then, by etching off (lifting off) the metallic film on the remaining photoresist film together with the photoresist film, the groove 16, the alignment marking 18, and the glass substrate 20 having electrodes made of a metallic thin film, are obtained on one principal surface. In this case, the alignment accuracy with respect to the groove 18 having a substantially inverse-trapezoidal cross section is within the range of ±2 µm for the parallel direction of the straight lines 34a and 34c and for the parallel direction of the straight lines 34b and 34d, respectively. On the glass substrate 20, optical parts such as an optical fiber are disposed, and a photodiode or a laser diode is further fixed to complete the glass element.

The inverse-trapezoidal groove 18 formed on the glass substrate 20 may also be used as a marking to recognize the orientation of the glass substrate 20, for example, an orientation flat for the wafer. In this case, it allows the direction of conveying and the state of disposition of the glass substrate 20 to be electrically identified, and thus it is effective for full automation of the volume production system using the glass substrate 20.

INDUSTRIAL APPLICABILITY

As described above, according to the present invention, a die is used to form a pattern of grooves to mount optical parts on a workpiece which can be aligned with a mask for photolithography with high accuracy. Further, the pattern of grooves having a substantially V-shaped cross section to mount optical parts are formed on the glass substrate, and the mask for photolithography can be aligned with high accuracy. Further still, by the method of pattern formation on the glass substrate according to the present invention, a pattern formed on one principal surface of the glass substrate can be aligned with the mask for photolithography with high accuracy.

What is claimed is:

1. A die comprising:
    a pressing surface;
    a first protrusion having a substantially triangular cross section formed on said pressing surface; and
    a second protrusion formed on said pressing surface and having a length which is greater than a width thereof and a substantially trapezoidal cross section in planes extending through both length and width dimensions thereof;
    said first protrusion being provided to form a first groove on a workpiece, said first groove having a substantially V-shaped cross section to mount an optical part on the workpiece; and
    said second protrusion being provided to form a second groove on the workpiece, said second groove having a length which is greater than a width thereof and a substantially inverse-trapezoidal cross section in planes extending through both length and width dimensions thereof, for providing an alignment marking on the workpiece.

2. A die according to claim 1, wherein the height of said second protrusion is 1 to 20 µm.

3. A die according to claim 1, wherein said second protrusion is used as a marking to identify an orientation of said die.

4. A die according to claim 2, wherein said second protrusion is used as a marking to identify an orientation of said die.

5. A method of manufacture of a die comprising the steps of:
    grinding an original plate to form a plurality of first protrusions having a substantially triangular cross section in a portion providing a pressing surface; and
    grinding at least one of said plurality of first protrusions to form a second protrusion having a length which is greater than a width thereof and a substantially trapezoidal cross section in planes extending through both length and width dimensions thereof.

6. A glass substrate having on one principal surface a groove with a substantially V-shaped cross section to mount an optical part, and a groove with a length which is greater than a width thereof and a substantially inverse-trapezoidal cross section in planes extending through both length and width dimensions thereof, for providing an alignment marking.

7. A glass substrate according to claim 6, wherein a depth of said groove with a substantially inverse-trapezoidal cross section is in a range of a focal depth for an optical inspection machine.

8. A glass substrate according to claim 7, wherein the depth of said groove with a substantially inverse-trapezoidal cross section is 1 to 20 µm.

9. A glass substrate according to claim 6, wherein said groove with a substantially inverse-trapezoidal cross section providing said alignment marking is used as a marking to identify an orientation of said glass substrate.

10. A glass substrate according to claim 7, wherein said groove with a substantially inverse-trapezoidal cross section providing said alignment marking is used as a marking to identify an orientation of said glass substrate.

11. A glass substrate according to claim 8, wherein said groove with a substantially inverse-trapezoidal cross section providing said alignment marking is used as a marking to identify an orientation of said glass substrate.

12. A method of manufacture of a glass substrate, wherein, by press forming with a die having a first protrusion having a substantially triangular cross section formed on a pressing surface of the die and a second protrusion having a length which is greater than a width thereof and a substantially trapezoidal cross section in planes extending through both length and width dimensions thereof on the pressing surface of the die, a groove with a substantially V-shaped cross section to mount an optical part, and a groove with a length which is greater than a width thereof and a substantially inverse-trapezoidal cross section in planes extending through both length and width dimensions thereof, for providing an alignment marking are formed in a location corresponding to said first protrusion and a location corresponding to said second protrusion, respectively, on one principal surface of the glass substrate.

* * * * *